June 11, 1968 D. DAVIDOFF 3,388,270
SCHMITT TRIGGER OR MULTIVIBRATOR CONTROL OF A DIODE BRIDGE
MICROSECOND SWITCH AND CHOPPER CIRCUIT
Filed Nov. 4, 1964

INVENTOR.
Dorsey Davidoff,
BY
H. H. Losche Att'ys.

United States Patent Office 3,388,270
Patented June 11, 1968

3,388,270

SCHMITT TRIGGER OR MULTIVIBRATOR CONTROL OF A DIODE BRIDGE MICROSECOND SWITCH AND CHOPPER CIRCUIT

Dorsey Davidoff, New York, N.Y., assignor, by mesne assignments, to the United States of America as represented by the Secretary of the Navy Filed Nov. 4, 1964, Ser. No. 409,039
3 Claims. (Cl. 307—257)

ABSTRACT OF THE DISCLOSURE

A microsecond switch and chopper circuit having a Schmitt trigger or bistable multivibrator with triggering pulses applied thereto for triggering same, the output of the Schmitt trigger or multivibrator being coupled to a diode bridge circuit to switch it off and on in accordance with the triggering pulses in very rapid sequence.

BACKGROUND OF THE INVENTION

This invention relates to electronic switches and chopper circuits and more particularly to a circuit for very rapidly changing the bias on the diodes of a resistor-diode bridge switch circuit to produce conduction and non-conduction through the diodes and, consequently, through the bridge switch circuit.

Gas tube switching circuits and mechanical relays, or a combination of gas tubes and mechanical relay switch circuits, are well known. With the coming of transistors the gas tube circuits were, in many instances, replaced by transistors, or transistor circuits were devised to produce inverters. All of these switching circuits have such disadvantages as requiring a warm-up time, requiring considerable space, involving considerable weight, being limited in switching frequency, or being unable to accomplish the dual function of a switch and a chopper.

SUMMARY OF THE INVENTION

In the present invention a combination of a transistorized Schmitt trigger circuit and a resistor-diode bridge switching circuit, or the combination of a transistor multivibrator circuit with the resistor-diode switching circuit, is used to produce a very fast acting or microsecond switch or chopper circuit. In this invention a control voltage can be used to trigger the Schmitt trigger circuit to produce "on" and "off" switching conditions of the resistor-diode bridge circuit, or an alternating current voltage can be applied to the Schmitt trigger to trigger same causing the resistor-diode switch bridge circuit to chop a voltage applied thereto. Where an alternating current voltage is applied to the Schmitt trigger, a Zener diode may be used to limit the amplitude swings of the alternating current voltage producing square wave "on" and "off" control voltages for the Schmitt trigger circuit. When the bistable multivibrator circuit is used in combination with the resistor-diode bridge switch, the base electrodes will have voltage pulses applied alternately thereto to switch the multivibrator to one or the other of its conductive states. In both the Schmitt trigger and multivibrator circuit combinations with the resistor-diode bridge switch, the two control terminals of the resistor-diode switch are connected, respectively, to the collector electrodes of the Schmitt trigger or multivibrator. Either combination will produce switching in the microsecond time range where rapid switching is required in the application of the device to circuitry, such as radar or other communications. It is a general object of this invention to provide a resistor-diode bridge switch circuit for producing exceedingly rapid switching conduction and non-conduction of an applied direct current voltage, or the chopping of the direct current voltage on the bridge switch circuit output.

BRIEF DESCRIPTION OF THE DRAWINGS

These and other objects and the attendant advantages, features, and uses will become more apparent to those skilled in the art as a more detailed description proceeds when considered along with the accompanying drawing, in which.

DESCRIPTION OF THE PREFERRED EMBODIMENTS

Figures 1, 2:
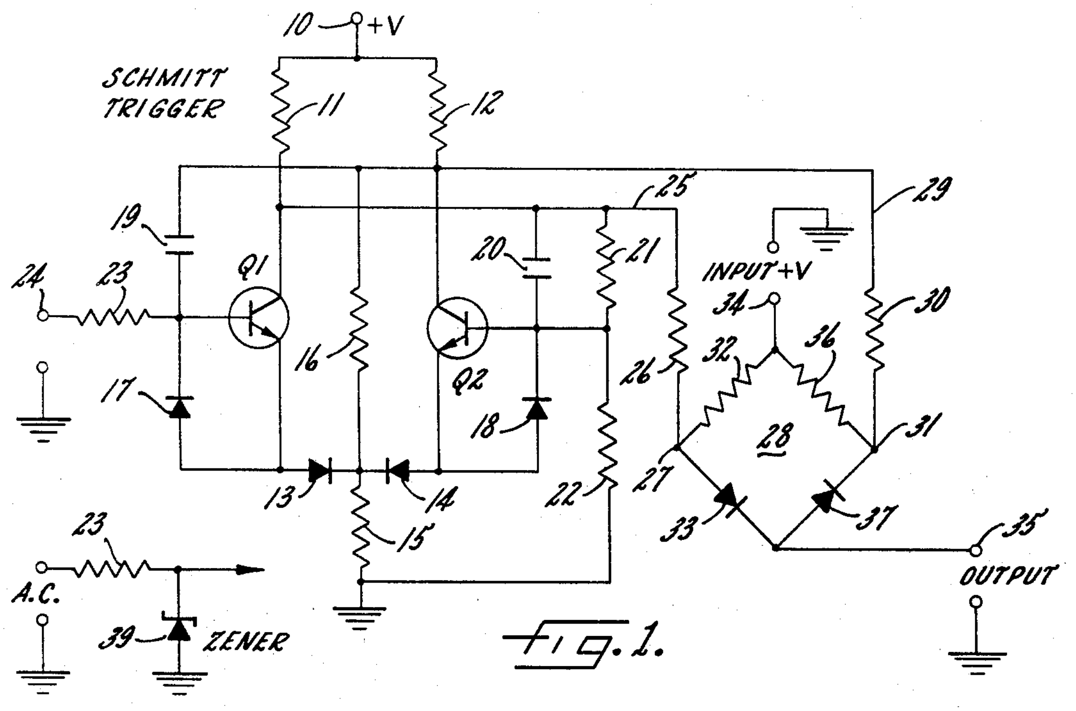
FIGURE 1 illustrates a circuit schematic of a Schmitt trigger circuit in combination with a resistor-diode bridge switch and chopper circuit.
FIGURE 2 illustrates a modification of the input to the circuit illustrated in FIGURE 1.

*FIGURE 1 description*

Referring more particularly to FIGURE 1, a Schmitt trigger circuit includes a pair of transistors Q1 and Q2 having the emitter and collector terminals coupled between a voltage source 10 through collector load resistors 11 and 12, respectively, and the emitters coupled through diodes 13 and 14, respectively, and through a resistor 15 to a fixed potential, such as ground of the voltage source. The emitters are biased by virtue of voltage division through a resistor 16 and the resistor 15, the resistor 16 being coupled between the collector of transistor Q2 and the junction of resistor 15 and diodes 13 and 14. The base of transistor Q1 is coupled to the emitter thereof through a diode 17 oriented with the cathode thereof coupled to the base and the anode coupled to the emitter. In like manner, a diode 18 is cathode coupled to the base of transistor Q2 and the anode thereof is coupled to the emitter of transistor Q2. The base of transistor Q1 is coupled through a capacitor 19 to the collector of transistor Q2, while the base of transistor Q2 is coupled through a capacitor 20 to the collector of transistor Q1. The base of transistor Q2 is likewise biased by voltage dividing resistors 21 and 22 from the voltage source 10 through resistor 11 to the fixed or ground potential. The base of transistor Q1 is coupled through an input resistor 23 to an input terminal 24 adapted to be coupled to a switch control voltage source.

The collector of transistor Q1 is coupled by way of a conductor 25 through a resistor 26 to a control terminal 27 of a resistor-diode bridge switching circuit 28, while the collector of transistor Q2 is coupled by way of conductor 29 through a resistor 30 to a control electrode 31 of the resistor-diode bridge switching circuit 28. The resistor-diode bridge switching circuit 28 consists of a resistor 32 and a silicon diode 33 in series from a voltage input terminal 34 to an output terminal 35 forming one leg of the bridge circuit 28. The other leg of the bridge circuit 28 is by way of resistor 36 and silicon diode 37 from the input 34 to the output terminal 35. The silicon diode 33 has its anode coupled to the control terminal 27 and its cathode coupled to the output terminal 35 whereas the silicon diode 37 has its cathode coupled to the control voltage terminal 31 and its anode coupled to the output terminal 35.

*Operation of FIGURE 1*

In the operation of FIGURE 1, as one operative example, let it be assumed that various elements and components have the following values or identifications:

| | |
|---|---|
| Transistors: | |
| Q1, Q2 | 2N338 |
| Diodes: | |
| 17 and 18 | 1N660 |
| 33 and 37 | 1N300 |
| Resistors (in ohms): | |
| 11, 12, 26, and 30 | 4.7K |
| 16, 21, and 22 | 47K |
| 23 | 10K |
| 15 | 180 |
| 32 and 36 | 1K |
| Capacitors: | |
| 19 and 20 ..... $\mu\mu f$ | 180 |

Let it be assumed that no voltage is presently being applied to terminal 24, that +25 volts is applied to terminal 10, and that +10 volts is applied to terminal 34. In this condition in the Schmitt trigger circuit, transistor Q1 will be in a nonconductive state which places a high voltage, near 25 volts, on the collector of transistor Q1. This collector voltage is reflected across the voltage divider 21 and 22 to the base of transistor Q2 to place this transistor in full conduction. Since transistor Q2 is in full conduction, its collector will have very low voltage thereon by virtue of the voltage drop across resistor 12, across transistor Q2 emitter collector electrodes, across diode 14, and across resistor 15. The emitter voltage for transistors Q1 and Q2 is provided by voltage division through the resistors 12, 16, and 15 at the junction point of resistors 15 and 16 through the diodes 13 and 14, which diodes prevent reverse currents from flowing in the emitter circuits. In this state of the Schmitt trigger with the collector voltage of transistor Q1 being high and the collector voltage of transistor Q2 being low, the control terminal 27 will have a high voltage thereon and the control terminal 31 of the bridge switching circuit 28 will have a low voltage thereon biasing both silicon diodes 33 and 37 to a conductive state. With the diodes 33 and 37 being in a conductive state the switch from terminal 34 to 35 is closed over both resistor-diode paths 32, 33 and 36, 37 from the voltage input 34 to the voltage output 35.

If a switching voltage, such as a positive voltage, is applied to terminal 24 to place transistor Q1 into conduction, the collector voltage of transistor Q1 will fall immediately placing a near zero bias on the base of Q2 to cut it off. The collector voltage of Q2 will rise immediately as the collector voltage of Q1 drops reversing the voltages on the control terminal points 27 and 31 such that the voltage at terminal 31 now will be high while the voltage on terminal 27 will be low immediately back biasing the silicon diodes 33 and 37. This switching operation of the Schmitt trigger is speeded up by virtue of the input positive control voltage signal from terminal 24 being conducted through capacitor 19 to the collector of transistor Q2 as well as to the base of Q1. In this condition the voltage input at terminal 34 is cut off from terminal 35 and the bridge circuit 28 is open. Upon the reduction of the switch voltage at terminal 24 to zero or below, transistor Q1 will again be cut off immediately biasing transistor Q2 to its conductive state re-establishing the closed condition of the bridge circuit 28. In this switching condition the immediate rise of the collector voltage of transistor Q1 is reflected through the capacitor 20 to the base of transistor Q2. Accordingly, it can be seen that the bridge switching circuit 28 can be switched "on" and "off" at will by the application of zero or positive voltage to the terminal 24. This operation of the Schmitt trigger can be ascertained readily in the text of McGraw-Hill's Electrical and Electronic Engineering Series in the volume entitled "Semiconductor Devices and Applications" by R. A. Greiner, 1961, in the Section 20–3, page 396. Since the Schmitt trigger switches in the microsecond range interval and silicon diodes 33 and 37 are rapid in their switching operation, the switching of the input voltage at terminal 34 to the output terminal 35 from the control voltage switching signals on terminal 24, is exceedingly rapid. Also, it may be readily recognized that the application of square wave voltages to terminal 24 will cause a chopping action of the voltage applied at terminal 34 in the bridge switching circuit 28.

It also may be apparent that an alternating current voltage may be used as a control switching voltage on terminal 24 but in the use of an alternating current it is recommended that the input from terminal 24 through the resistor 23 be limited by means, such as a Zener diode 39 illustrated in FIGURE 2. Zener diode 39 will clip the voltage amplitude peaks of the alternating current sine wave voltage providing near square wave voltage input, thus removing the possibility of damage to the transistors Q1 and Q2.

Figure 3:
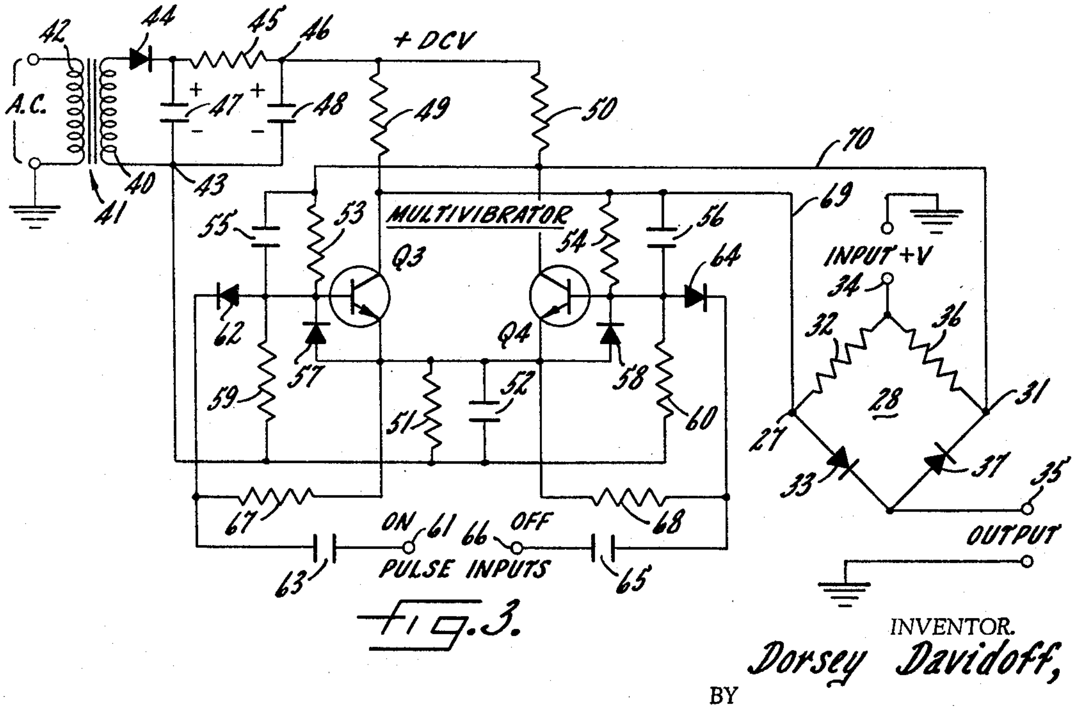
FIGURE 3 illustrates a circuit schematic of a bistable multivibrator in combination with a resistor-diode switch and chopper circuit.

*FIGURE 3 description*

Referring more particularly to FIGURE 3, a bistable multivibrator circuit is shown utilizing two transistors Q3 and Q4 coupled to a floating voltage supply coming from the secondary 40 of a transformer 41, the primary 42 of which has alternating current voltage applied thereto. The secondary 40 has one lead coupled to a negative terminal 43 while the other secondary lead is coupled through a rectifier 44 and a resistor 45 to the positive terminal 46 of the floating voltage source. Filtering capacitors 47 and 48 are conupled to the negative terminal 43 from opposite leads of the resistor 45.

Positive direct current voltage is coupled from the terminal 46 through a collector load resistor 49 to the collector of transistor Q3, while the collector of transistor Q4 is coupled to this direct current voltage source through the collector load resistor 50. The emitters of transistors Q3 and Q4 are coupled in common and this common coupling of the emitters is connected through a parallel network consisting of resistor 51 and capacitor 52 to the negative terminal 43 of the floating power source. The base of transistor Q3 is biased through the base biasing resistor 53 from the collector of transistor Q4 through the collector load resistor 50, while the base of transistor Q4 is biased through the base biasing resistor 54 from the collector of transistor Q3 through the collector load resistor 49. The resistor 53 is paralleled by capacitor 55, while the resistor 54 is paralleled by capacitor 56. The base of transistor Q3 is coupled to the cathode of a diode 57, the anode of which is coupled to the emitter of this transistor, while the base of transistor Q4 is coupled to the cathode of diode 58 having the anode thereof coupled to the emitter of this transistor. Base biasing voltage for transistor Q3 is completed by the resistor 59, while the base biasing voltage of transistor Q4 is completed by the resistor 60. The base of transistor Q3 is also coupled to a switching control terminal 61 through a diode 62 and a capacitor 63 with the diode 62 being oriented with its anode coupled directly to the base of transistor Q3. The base of transistor Q4 is similarly coupled through a diode 64 and capacitor 65 to terminal 66. The terminal 61 is identified as being the "on" terminal, while terminal 66 is identified as being the "off" terminal, as will later become clear. The junction of diode 62 and capacitor 63 is coupled through a resistor 67 to the emitter of transistor Q3, while the junction of diode 64 and capacitor 65 is connected through a resistor 68 to the emitter of transistor Q4.

The collector of transistor Q3 is directly coupled to control terminal 27 of the bridge switching circuit 28 by way of conductor 69, and the collector of transistor Q4 is coupled by way of conductor 70 to the control terminal 31 of the bridge circuit 28. Since bridge circuit 28 in this figure is the same or similar to the bridge circuit shown in FIGURE 1, like reference characters are used for like parts.

*Operation of FIGURE 3*

In the operation of the invention illustrated in FIGURE 3, the following values or identification may be given to the various elements of the circuit as showing one operative sample of the invention:

| | | |
|---|---|---|
| Transistors: | | |
| Q3, Q4 | | 2N335 |
| Diodes: | | |
| **44** | | 1N538 |
| **62, 64, 33,** and **37** | | 1N660 |
| **57** and **58** | | 1N198 |
| Resistors (in ohms): | | |
| **45** | | 2K |
| **49** and **50** | | 4.7K |
| **53, 54, 59, 60, 67,** and **68** | | 47K |
| **32** and **36** | | 1K |
| **51** | | 470 |
| Capacitors: | | |
| **27** and **48** | μμf | 10 |
| **52** | μf | .01 |
| **55** and **56** | μμf | 180 |
| **63** and **65** | f | 390 |

Referring more particularly to FIGURE 3, let it be assumed that the alternating current input to the transformer 41 is such as to provide about 28 volts direct current at terminal 46. This would mean that the voltage between terminals 46 and 43 is 28 volts and is floating since it is not related to ground or any other fixed voltage at any point. When the multivibrator circuit is turned "on," one or the other of transistors Q3 will become conductive which will hold the other transistor in a nonconductive state, as is well known of such bistable multivibrators. For the purpose of example herein, let it be assumed that transistor Q3 is in a nonconductive state in which transistor Q4 will be fully conductive. In this condition the collector voltage of transistor Q3 will be high placing a high voltage at terminal 27, while the collector voltage of transistor Q4 will be low placing a low voltage at control terminal 31 in the bridge circuit 28. High voltage at 27 and low voltage at 31 forwardly biases diodes 33 and 37 placing the bridge circuit 28 in a state of conduction in which voltage applied at terminal 34 is switched "on" to the output terminal 35. If a negative pulse is applied to the off terminal 66, the base voltage of transistor Q4 will be immediately lowered cutting off this transistor which immediately causes the collector voltage to rise. This high collector voltage of Q4 is immediately conducted through capacitor 55 to the base of transistor Q3 turning this transistor "on." The high collector voltage of transistor Q4 maintains a bias through the biasing resistors 53 and 59 on the base of transistor Q3 maintaining transistor Q3 conductive. The emitter of transistor Q3 remains well below the base voltage in this switching condition by virtue of the orientation of the diode 57, whereas transistor Q4 maintains the base electrode at no lower voltage level than the emitter thereof by virtue of the diode 58. The high collector voltage of transistor Q4 is now transmitted by conductor 70 to control terminal 31 of the bridge switching circuit 28, and the low collector voltage of transistor Q3 is transmitted by conductor 69 to the control terminal 27, back biasing the silicon diodes 33 and 37 to switch "off" conduction, or cause a disconnection, between terminals 34 and 35. The negative pulse applied to the "off" terminal 66 is conducted by way of the resistor 68 to pull the emitter voltage of transistor Q3 downwardly at a rapid rate at the same time that this negative pulse is applied to the base of transistor Q4. Since the base voltage of Q4 falls faster than the emitter voltage dropping through resistor 68, Q4 will become nonconductive. Resistor 68, diode 57, and capacitor 55 all assist in the rapid switching operation of the multivibrator to the "off" condition of the bridge circuit 28. In like manner, the resistor 67, diode 58, and capacitor 56, assists rapid switching to the "on" condition of the bridge circuit 28 when a negative pulse is applied to the "on" terminal 61. The floating power source provided through the transformer 41 will allow the resistor junction of the diode resistor bridge 28 to be connected to any voltage desired and when the diodes are in their conducting condition the bridge will act like a switch, switching the diode junction to the same voltages as that of the resistor junction. By applying negative pulses alternately to the terminals 61 and 66 at a certain frequency, the voltage applied to terminal 34 will be chopped in accordance with that frequency. Accordingly, a rapidly actuated bridge switching circuit is produced by the combination of the rapidly acting bistable multivibrator in combination with the bridge switching circuit 28 in accordance with switching negative pulses applied to terminals 61 and 66. If a chopping action of the voltage applied to terminal 34 is desired, this voltage will be chopped in accordance with the frequency of the "on" and "off" switch pulses applied to terminals 61 and 66.

Although the above two examples of values and identification of elements are given herein to describe the operation of the two embodiments, it is to be understood that these values or types are not in any way meant to limit the invention and that freedom of choice is offered within the teaching herein.

While many modifications and changes may be made in the constructional details and features of this invention to obtain the results and functions shown and described herein to accomplish specific purposes, it is to be understood that I desired to be limited in the scope of my invention only to the extent limited by the appended claims.

I claim:

1. An electronic microsecond switch and chopper circuit comprising:

a bridge circuit having a resistance and a diode in series in each of two legs from an input to an output with a control terminal at each resistance and diode junction, said diodes being oriented with the anode of one and the cathode of the other coupled to said output;

a switching circuit having a pair of transistors therein coupled to produce alternate conduction in alternate switched conditions, the collector of one transistor being coupled to one control terminal of said bridge circuit and the collector of the other transistor being coupled to the other control terminal of said bridge circuit to produce a high voltage on said one control terminal and a low voltage on said other control terminal in one condition of said switching circuit to bias said diodes for conduction between said input and output of said bridge circuit, and to produce a low voltage on said one control terminal and a high voltage on said other control terminal in another condition of said switching circuit to bias said diodes for nonconduction therethrough between said input and said output;

means coupled to said switching circuit providing voltage signals to switch same to its alternate switched conditions; and a voltage amplitude limiting means consisting of a Zener diode having its cathode coupled to said switching circuit and its anode coupled to a fixed potential whereby said bridge circuit is switched from conduction and nonconduction between said input and output of said bridge circuit in accordance with the voltage signals of said means coupled to said switching circuit with the voltage signals of said means limited in amplitude to said switching means.

2. An electronic microsecond switch and chopper circuit as set forth in claim 1 wherein said switching circuit is a transistor Schmitt trigger circuit, and said means coupled to said switching circuit providing voltage signals is an alternating current input through a resistance whereby the circuit between said input and output of said bridge circuit will be chopped at the frequency of said alternating current.

3. An electronic microsecond switch and chopper circuit as set forth in claim 1 wherein said switching circuit is a transistor bistable multivibrator with a floating power supply across the emitter and collector electrodes, the outputs of said multivibrator being from each collector, and said means coupled to said switching circuit providing voltage signals are two pulse source inputs coupled, respectively, to each base electrode.

References Cited

UNITED STATES PATENTS

| | | | |
|---|---|---|---|
| 2,761,130 | 8/1956 | Kibler | 307—88.5 X |
| 2,808,474 | 10/1957 | Maynard et al. | |
| 3,104,327 | 9/1963 | Rowe | 307—88.5 |
| 3,109,977 | 11/1963 | Redfern. | |
| 3,158,813 | 11/1964 | Brooksby | 307—88.5 X |
| 3,159,751 | 12/1964 | Bogdan et al. | 307—88.5 |
| 3,217,184 | 11/1965 | Lach | 307—88.5 |
| 3,222,547 | 12/1965 | Boan et al. | 307—88.5 |
| 3,226,650 | 12/1965 | Higbie | 307—88.5 X |
| 3,324,309 | 6/1967 | Zeller | 307—88.5 |

OTHER REFERENCES

Millman et al.: Pulse and Digital Circuits, 1956 (pp. 438, 439).

Motorola Silicon Zener Diode and Rectifier Handbook, 2nd ed., 1961 (pp. 112, 113).

ARTHUR GAUSS, *Primary Examiner.*

DONALD D. FORRER, *Examiner.*